(12) United States Patent
Elliott et al.

(10) Patent No.: US 9,421,480 B2
(45) Date of Patent: Aug. 23, 2016

(54) SOLID SETTLING TANK

(71) Applicant: REPSOL OIL & GAS CANADA INC., Calgary (CA)

(72) Inventors: David J. Elliott, Dawson Creek (CA); Gentian Toska, Dawson Creek (CA)

(73) Assignee: Repsol Oil & Gas Canada Inc., Calgary (CA)

( * ) Notice: Subject to any disclaimer, the term of this patent is extended or adjusted under 35 U.S.C. 154(b) by 387 days.

(21) Appl. No.: 13/859,937

(22) Filed: Apr. 10, 2013

(65) Prior Publication Data

US 2013/0264278 A1    Oct. 10, 2013

(51) Int. Cl.
*B01D 21/24* (2006.01)
*B01D 21/00* (2006.01)
*B01D 21/34* (2006.01)

(52) U.S. Cl.
CPC ....... *B01D 21/0024* (2013.01); *B01D 21/0003* (2013.01); *B01D 21/0006* (2013.01); *B01D 21/2405* (2013.01); *B01D 21/2433* (2013.01); *B01D 21/34* (2013.01)

(58) Field of Classification Search
CPC .......... B01D 21/0003; B01D 21/0006; B01D 21/0024; B01D 21/10; B01D 21/2405; B01D 21/2433; B01D 21/2444; B65D 25/38; B65D 47/04; B65D 47/06; B65D 47/12; F16L 25/12
USPC .............. 210/232, 519, 532.1, 540; 137/590, 137/592, 597; 220/601, 661; 285/124.3
See application file for complete search history.

(56) References Cited

U.S. PATENT DOCUMENTS

| | | | | |
|---|---|---|---|---|
| 1,102,463 A | * | 7/1914 | Wyckoff | B01D 21/245 210/519 |
| 1,147,881 A | * | 7/1915 | Morris | B01D 17/0208 210/540 |
| 1,741,187 A | * | 12/1929 | Fuqua | B01D 17/0208 210/519 |
| 4,014,786 A | * | 3/1977 | Potter | B01D 17/0208 210/519 |
| 6,161,562 A | * | 12/2000 | Keefer | F02M 37/0017 137/590 |
| 2010/0230347 A1 | * | 9/2010 | Haslem | B01D 17/0208 210/523 |
| 2013/0032531 A1 | * | 2/2013 | Keith | 210/532.1 |

* cited by examiner

*Primary Examiner* — Christopher Upton

(74) *Attorney, Agent, or Firm* — McCarthy Tétrault LLP

(57) ABSTRACT

A door for a settling tank is provided, including a suction port for connection to a suction pipe within the settling tank; a discharge port positioned below the suction port, for connection to a discharge pipe within the settling tank, and for receiving a pipe providing discharge from a discharge source; an overflow port positioned adjacent to the suction port; and a frac fill port.

11 Claims, 4 Drawing Sheets

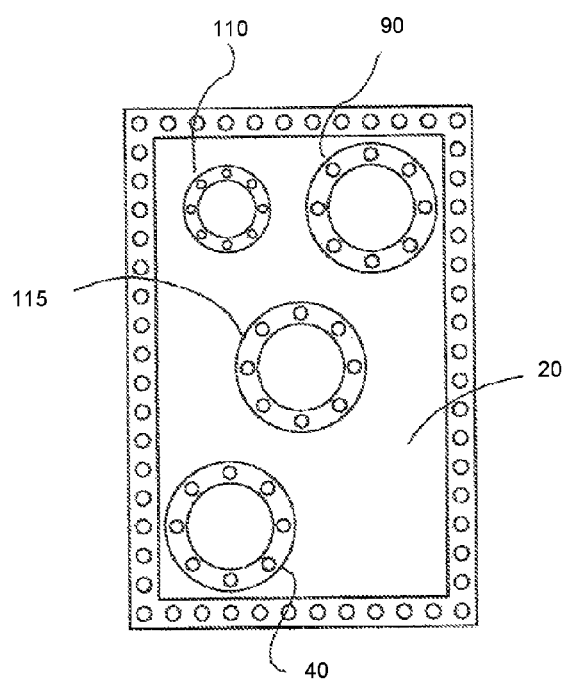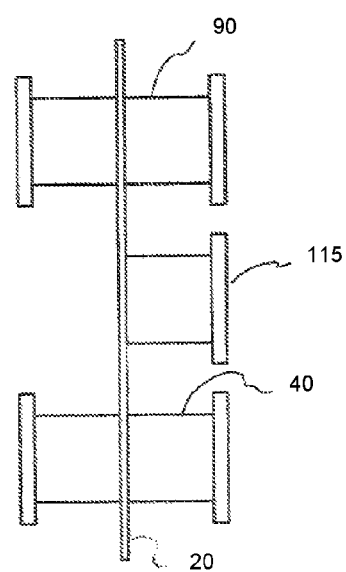
FIG. 5
FIG. 4

SOLID SETTLING TANK

RELATED APPLICATION

The present application claims the benefit of priority under 35 U.S.C. 119 on Canadian Patent Application Serial No. 2,773,586, filed Apr. 10, 2012, and entitled "Solid Settling Tank", all commonly owned herewith.

FIELD

The invention relates to tanks for shale gas wells, and more particularly to tanks for storing flowback water received after the well has been stimulated with frac water.

BACKGROUND

Hydraulic stimulation (known as fracture or frac) is used in shale gas wells that use slick water frac to stimulate, or fracture the shale. Slick frac water (also referred to herein as "frac water") includes either fresh water, or a blend of fresh and treated 'flow back' water. Treated flow back water is water that had been previously pumped into the shale formation, and was returned to the surface during the testing and production periods. The flow back water generally contains dissolved and suspended solids, typically having high concentrations of dissolved salts and other minerals in the form of suspended fines. Flow back water is stored in large pressure vessels, such as tanks, prior to reuse.

Any sand, salt, or other solid concentrations in the flow back water can cause problems with water reuse during well testing, as well as additional wear and tear on pumping equipment. Therefore it is best if the solids in the flow back water are separated before leaving the tank.

During the process of "flowing" the well, after pumping the sand and water into the well, the frac equipment is removed and the well is 'flow tested', meaning the well head is opened up and the gas and water returned to the surface under pressure. Measurements are then taken, and the quality of the well can be extrapolated during this flow period. After the testing is completed, the well is tied in and production begins. The gas and water returned from the well is directed to a tank wherein the primary separation of water, sand and gas occurs. The common tanks used to store the flow back water are large upright cylindrical tanks, typically having a 400 bbl (60 m$^3$) capacity and a door allowing workers to access the interior of the tank The liquid in the tank is a mixture of water, salts dissolved in water, and fines suspended in the same. The size of fines varies from sand grain size (from sand used as propant during the frac phase) to finer solids from the reservoir, and could range from less than 1 micrometer to greater than 300 micrometers. Depending on the flow rate from the well, size of vessel, water to gas ratio, viscosity etc., there are various retention times of water in the tank. The retention time in the tank, in combination with other physical properties of the flowback mixture such as temperature, viscosity, turbulence etc., controls the degree of separation of the variously sized solids.

The flow back water is typically directed to a pressure test vessel first. The primary function of the pressure vessel tank is to separate the gas from the water and sand grain size fines, or solids, and redirect the gas to the well flare. The sand grain size solids are periodically cleaned from the pressure vessel by stopping the flow of water from the well, and using a vacuum truck, or in some cases, by opening the door of the pressure vessel and shoveling the contents outside, or into the suction of a vacuum truck suction hose. The water and finer solids mixture is directed to other collecting tanks, such as standard oilfield 400 bbl sloped bottom tanks, large reservoirs in the form of C-ring from Westeel, settling tanks, or any other form of collecting and storing flowback water. Alternatively, the water may be pumped directly through a pipeline to some other system for reconditioning and subsequent reuse or disposal.

Since there are still some solids in the water after it leaves the pressure vessel and the subsequent tanks are significantly larger than the pressure vessel (and hence have a higher retention time) some of the solids deposit in the bottom of these settling tanks. These solids deposits build up inside the settling tank and removal of them is typically done by connecting a vacuum truck to one of the ports on the tank and sucking the solids out, or alternatively by using a door and cleaning out the solids with the use of a worker and shovel. Typically the tanks are filled in the front and discharged in the back, and in other cases they are cascaded from one tank to the next and so on. This causes the solids that are dropped in to the bottom of the tank to get disturbed frequently by the water coming from the inlet of the tank, and the solids then get carried to the discharge of the tank and subsequently into the next tank, pump or the flow line.

SUMMARY

The invention includes a door on a side of the settling tank. The door includes integrated pipes and provides for a 50-80% reduction in solids concentration leaving the tank. This is achieved by redirecting the flow inside the tank and positioning of the inlet of the tank solids deposit zone and discharge piping. By settling as much solid as possible within the tank, the amount of solids transferred outside of the tank is minimized, and the tanks are easy to clean with a vacuum truck. The settled solids are thusly contained within the tanks, where clean up is simpler.

A door for a settling tank is provided, including: a suction port for connection to a suction pipe within the settling tank; a discharge port positioned below the suction port, for connection to a discharge pipe within the settling tank, and for receiving a pipe providing discharge from a discharge source; an overflow port positioned adjacent to the suction port; and a frac fill port.

The discharge pipe ends at a discharge outlet with a deflection plate. The suction pipe ends at a suction inlet, the suction inlet positioned above the door. The overflow port is connected to a condensation overflow pipe having a condensate inlet, the condensate inlet positioned above the suction inlet. The door is removable from the tank.

A settling tank is provided, including a removable door for allowing access into said tank, the door having a suction port; and a discharge port; wherein the discharge port is in communication with a discharge source external to said tank, and to a discharge pipe within the tank, the discharge pipe ending at a position lower than the discharge port; and the suction port is in fluid communication with a water storage vessel exterior to the tank, and to a suction pipe within the tank, the suction pipe extending upwardly from the door, the suction pipe ending at a suction inlet.

BRIEF DESCRIPTION OF THE FIGURES

FIG. 4 is a side view of the door and ports; and

FIG. 5 is a front view of the door showing the ports.

DESCRIPTION

Figure 1:
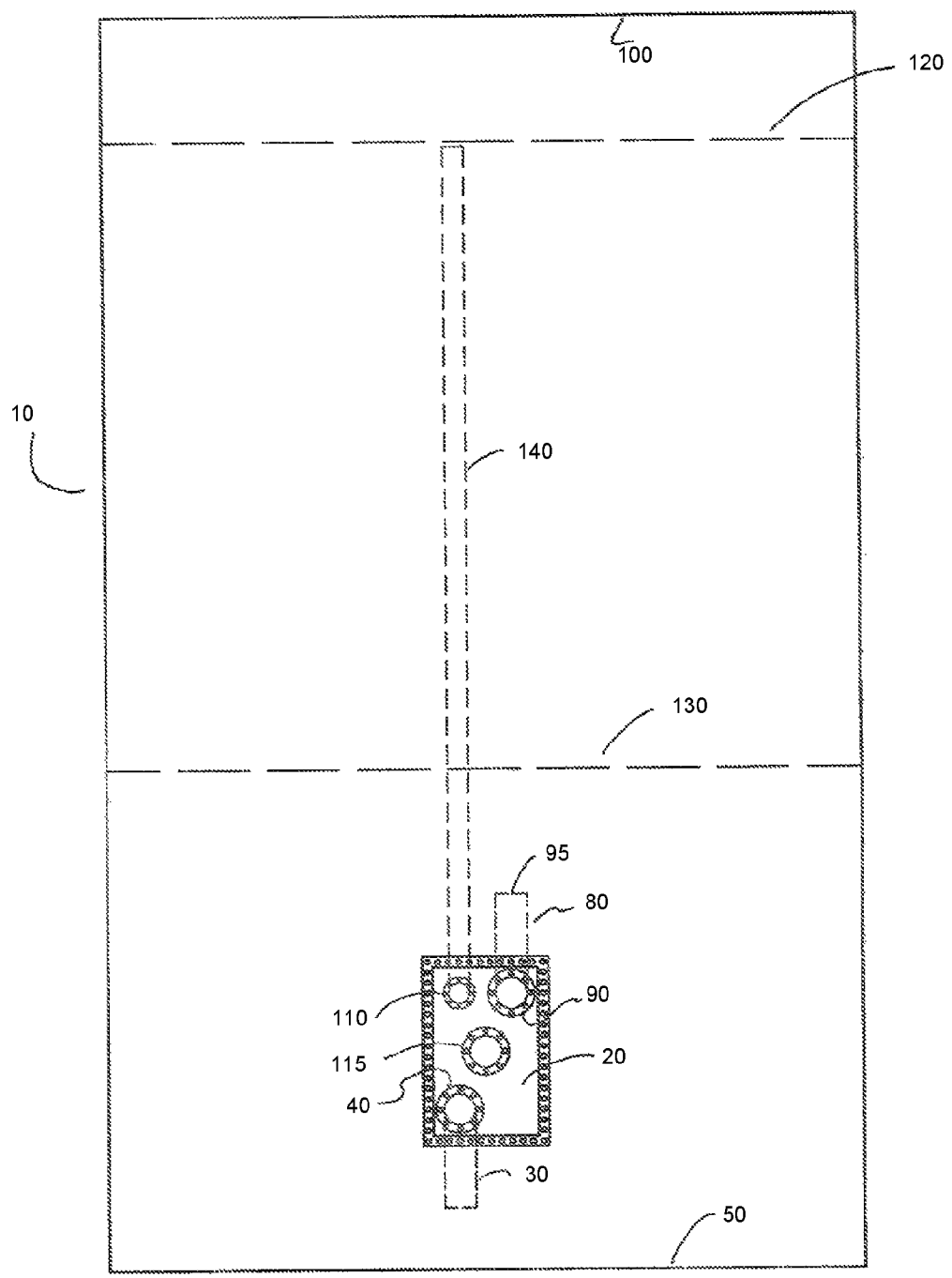
FIG. 1 is a front view of the door and tank according to the invention.

The tank according to the invention, and as shown in FIG. 1, includes a conventional upright standing tank 10. Tank 10 is typically cylindrical, but may be another shape, such a right angle parallelepiped.

Tank 10 includes door 20, as shown in FIGS. 2 through 5, which is bolted to tank 10 to cover an opening to tank 10. Door 20, when bolted to tank 10, is sealable to prevent water seepage from tank 10, for example, with the use of a rubber gasket. Door 20 is sized to allow passage for a person into tank 10 through the opening and is positioned low enough on tank 10 to allow access.

Discharge pipe 30 is securable to discharge port 40, which passes through door 20. Discharge pipe 30 terminates at discharge outlet 60 positioned above the tank bottom surface 50, for example about twelve inches (ranges include 8 to 15 inches, or 6 to 24 inches) from the tank bottom surface 50. Discharge pipe 30 may extend from discharge port 40 parallel to bottom surface 50 of tank 10, until meeting angle joint 55 which lowers discharge pipe 30 to the desired height above surface 50. Discharge outlet 60 includes deflection plate 70 extending therefrom and provides a barrier to the water flowing from discharge pipe 30, which lowers the kinetic energy of the water and solids mixture, giving the water flow a more laminar up flow regime at a lower velocity, and minimizing disturbance of the settled solids in tank 10. Users of tank 10 discharge recovered frac water from the drilling site into tank 10 through discharge port 40.

Suction pipe 80 is connected to suction port 90 which passes through door 20 and is positioned above discharge outlet 60. Suction port 90 is connected to a pump (not shown), which may be positioned outside of tank 10. Suction pipe 80 extends from suction port 90 upwards to an inlet 95 at a position closer to the top surface 100 of tank 10, for example about 72 inches above bottom surface 50, or alternatively at a range of from about 48 to 100 inches.

The positioning of the inlet 95 at the top of suction pipe 80 depends on the degree of separation of solids required from the process, the lower the height of inlet 95 provides less separation and a higher height will provide greater separation of solids but less recoverable volume of water. If inlet 95 is too low, the chance of drawing solids out increases, but if inlet 95 is too high, the volume of water that may be moved from tank 10 becomes low.

In an embodiment of the invention a plurality of tanks 10 can be connected in parallel discharge for better efficiency, and the inlets 95 can be raised to about 72 inches from bottom surface 50 and the desired water retention time (which controls the degree of separation) is regulated by varying the number of tanks 10 connected in parallel. For example if only one well is providing flow rates up to 20 m³/hr flowrate to the tank 10, two tanks 10 in parallel may be used to achieve the required solids separation. Alternatively if there are four wells flowing water at 80 m3/hour, then six or more tanks 10 in parallel may be needed to achieve the required separation.

Stockes' law can be used to calculate the required retention time in tank 10 based on the water properties, but a correlation of the calculation with real life data should be used for best results. The number of tanks 10 and height of suction inlet 95 also dictates the amount of water that can be stored in tanks 10, as the only volume that is recoverable in tank 10 is the volume above inlet 95. Thus, depending on the required storage volume the number of tanks 10 can be increased or decreased. The suction pipe 80 is connected to a pump for fast depletion of the water volume above inlet 95. Alternatively, the water can be directed to another water storage vessel via a gravity feed in the case of low flow rates from the pressure vessel.

An overflow port 110 and frac fill port 115 are also positioned at door 20. Frac fill port 115 can be used as an extra port, allowing door 20 and tank 10 to serve two purposes. For one purpose tank 10 is used for frac operations. In this case, water is pumped into tank 10 via frac fill port 115 and stored in tank 10 until used for the frac job. The second purpose is when the frac job is completed, and the tanks are used to hold the flow back water and settle solids, in which case frac fill port 115 need not be used.

Figure 2:
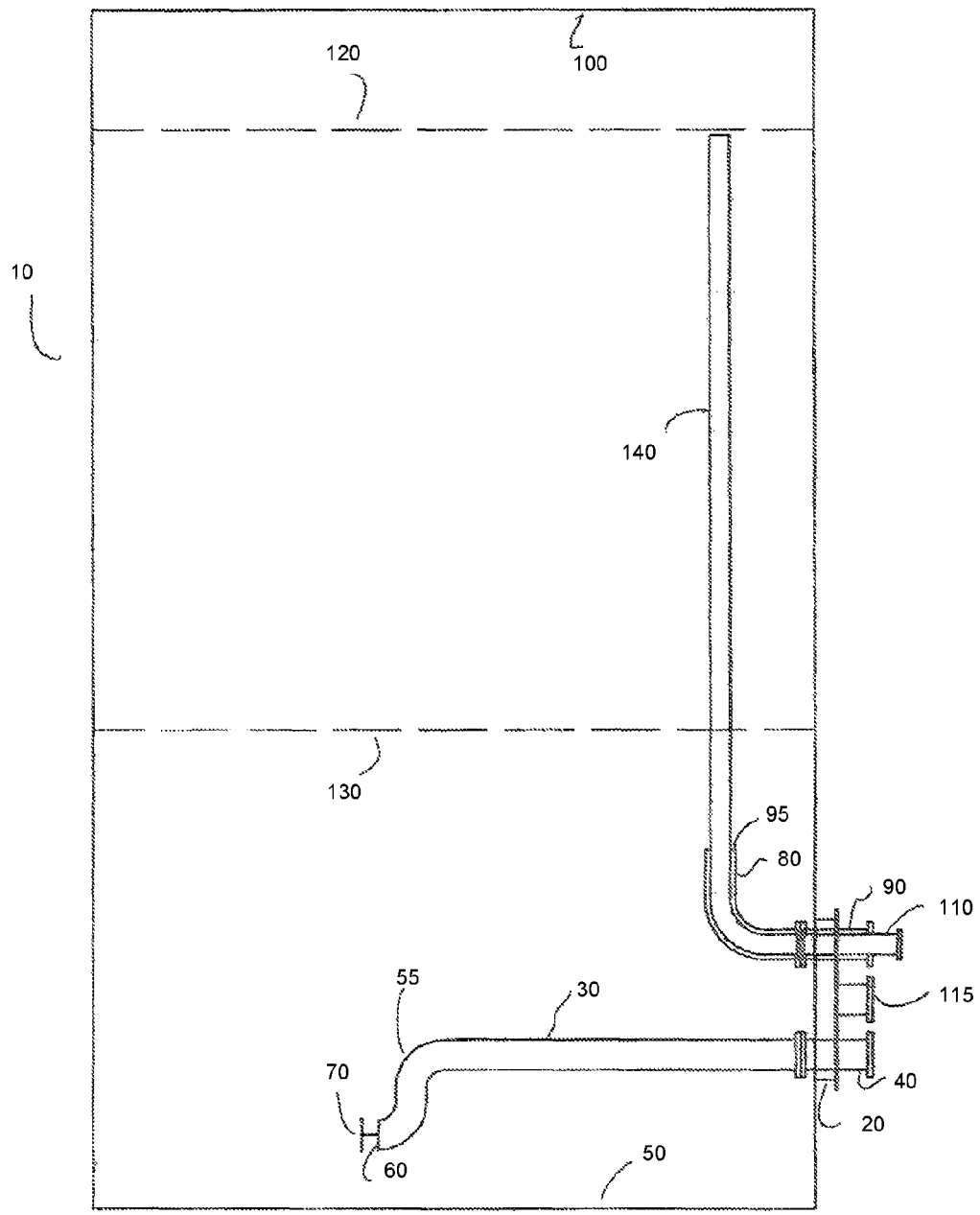
FIG. 2 is a side cross sectional view thereof.
Figure 3:
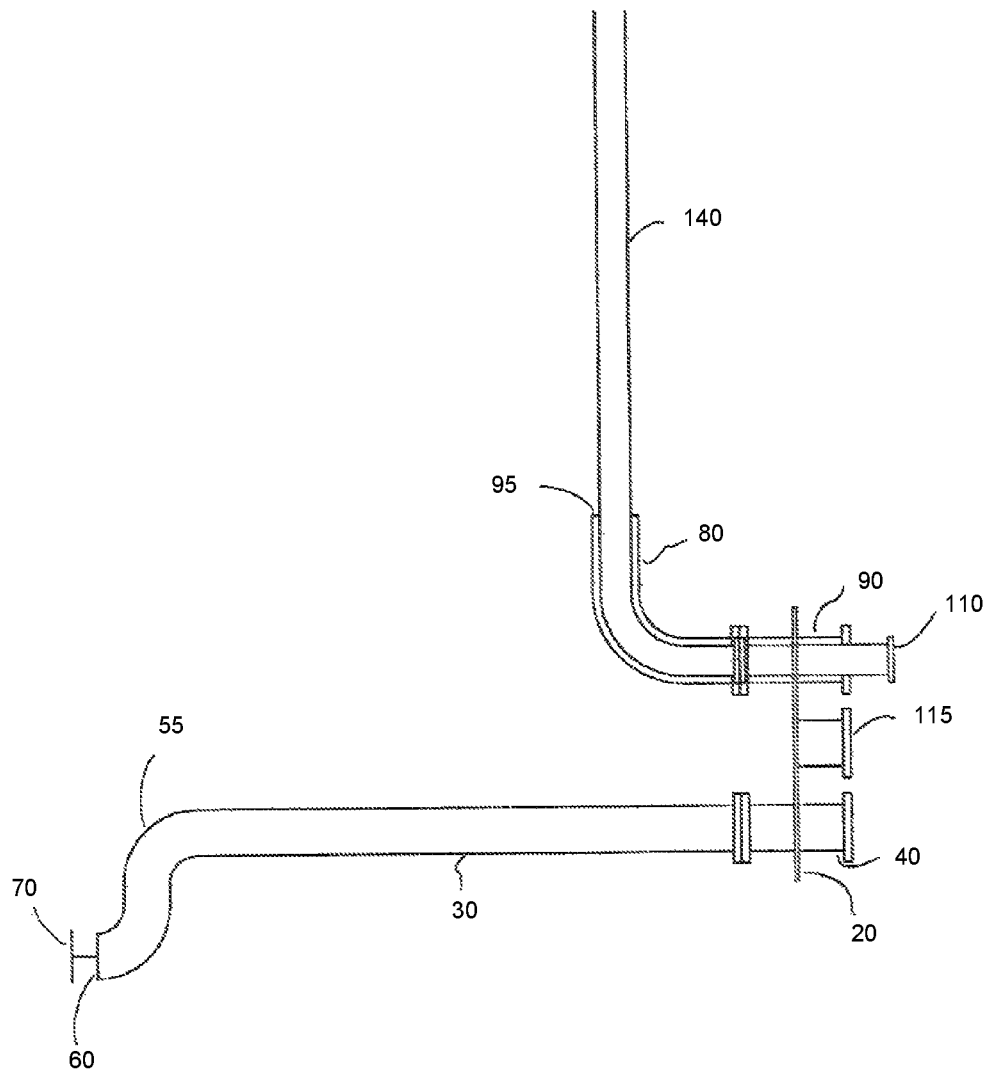
FIG. 3 is a side view showing the piping and ports in detail.

The condensate overflow port 110 may be used, as shown in FIGS. 1 and 2, in cases where there is also condensate production (e.g. oils and petrochemicals) from the well, to connect condensate outlet pipe 140 to, which reaches to a height close to top 100 of tank 10. The condensate is lighter than water and floats on top of the water. The condensate is valuable and is preferably captured and sold, rather than disposed of and wasted. Door 20 can thus be used to convert tank 10 into an atmospheric three phase separator (water, condensate and solids). In this case, overflow port 110 is connected to the suction of a pump (not shown) or the gravity feed of another tank, and allows the condensate to overflow to a nearby storage facility. Instrumentation or a sampling valve on the condensate pipe line can be used to control the condensate flow either through human control (i.e. open/close a valve or pump manually) or automatic instrumentation (such as a conductivity transmitter).

Door 20 having ports 40, 90, 110 and 115 concentrated in the door and in one location makes it easier to make the required connections to tank 10 and also allows the use of such doors 20 in any type of tank, as the only piece that needs to be modified is door 20, rather than the entire tank 10. If tank 10 is for use for another purpose that does not require the solids separation or condensate separation a blank door can be installed.

In operation, tank 10 should be filled slowly, allowing the solids time to settle towards surface 50, and the water is then pumped out rapidly, and then the process is repeated. The tank 10 can be mounted with an automatic start/stop control (e.g. switches positioned at high water level 120 and low water level 130) for the pump, or the pump can be operated manually by a user watching the tank 10 fluid levels.

The water entering tank 10 is discharged at some distance from the point of entry to tank 10 by the use of discharge pipe 30, and deflector plate 70 dissipates the kinetic energy of the water stream and facilitates the laminar flow of water leaving outlet 60, so that the water will then move upwards at very slow velocity. At this lowered velocity, the particles (sand and other suspended solids) entrained in the water will drop down due to gravity and the density change (assuming the suspended solids are higher density than water).

The water is removed from tank 10 via suction pipe 80 at some vertical distance from the discharge of solids/water in the tank 10. This ensures that solids have had adequate time to drop to the bottom of tank 10 before the water reaches inlet 95.

The system is scalable to accommodate different water rate and solids separation sizes by optimizing the number of tanks 10 in parallel or the height of inlet 95. Also door 20 can be used at any standard oilfield tank, and does not require the manufacture of special tanks. The system according to the invention is also flexible as it can be used to achieve different results of solids settling by varying the intake pipe 30 height from floor 50 or the number of tanks 10 used, or the geometry of the tank 10.

The piping used for discharge pipe 30, suction pipe 80, and condensate outlet pipe 140 can vary and depend on the frac process conditions, such as flow rate, solids content, size, viscosity etc. The relationship between the level of suction pipe and number of tanks, is a direct application of the Stokes' Law:

$$F_d = 6\pi\mu R\, v_s$$

wherein $F_d$ is the frictional force acting on the interface between the fluid and the particle (in N), $\mu$ is the dynamic viscosity (N s/m$^2$), R is the radius of the spherical object (in m), and $v_s$ is the particle's settling velocity (in m/s).

The above-described embodiments have been provided as examples, for clarity in understanding the invention. A person with skill in the art will recognize that alterations, modifications and variations may be effected to the embodiments described above while remaining within the scope of the invention as defined by claims appended hereto.

What is claimed:

1. A settling tank, comprising:
   a removable door for allowing access into the settling tank, the removable door comprising:
   i) a suction port; and
   ii) a discharge port;
   wherein the discharge port is in fluid communication with a discharge source external to the settling tank and to a discharge pipe within the settling tank, the discharge pipe ending at a position lower than the discharge port; and
   wherein the suction port is in fluid communication with a water storage vessel exterior to the settling tank, and to a suction pipe within the settling tank, the suction pipe extending upwardly from the removable door, the suction pipe ending at a suction inlet.

2. The settling tank of claim 1, wherein the discharge pipe ends at a discharge outlet with a deflection plate.

3. The settling tank of claim 2, wherein the removable door further comprises:

iii) an overflow port, the overflow port connected to a condensation overflow pipe having a condensate inlet, the condensate inlet positioned above the suction inlet.

4. The settling tank of claim 3, wherein the overflow port is positioned adjacent to the suction port.

5. The settling tank of claim 1, wherein the removable door further comprises
   a frac fill port.

6. A settling tank, comprising:
   a door for allowing access into the settling tank, the door comprising:
   a suction port; and
   a discharge port;
   a discharge pipe within the settling tank; and
   a suction pipe within the settling tank, the suction pipe extending upwardly from the door and ending at a suction inlet in the settling tank,
   wherein
   the discharge port is in fluid communication with a discharge source external to the settling tank and to the discharge pipe; and
   the suction port is in fluid communication with a water storage vessel exterior to the settling tank and to the suction pipe.

7. The settling tank of claim 6, wherein the discharge pipe ends at a position lower than the discharge port.

8. The settling tank of claim 6, wherein the discharge pipe ends at a discharge outlet with a deflection plate in the settling tank.

9. The settling tank of claim 6, wherein the door further comprises:
   an overflow port, the overflow port connected to a condensation overflow pipe in the settling tank having a condensate inlet in the settling tank, the condensate inlet positioned above the suction inlet.

10. The settling tank of claim 6, wherein the door further comprises:
    a frac fill port.

11. The settling tank of claim 6, wherein the door is removable from the settling tank.

* * * * *